May 26, 1970 R. J. ROMAN 3,514,196
MOTION PICTURE PROJECTOR
Original Filed July 25, 1966 3 Sheets-Sheet 1

ROBERT J. ROMAN
INVENTOR.

BY
ATTORNEYS

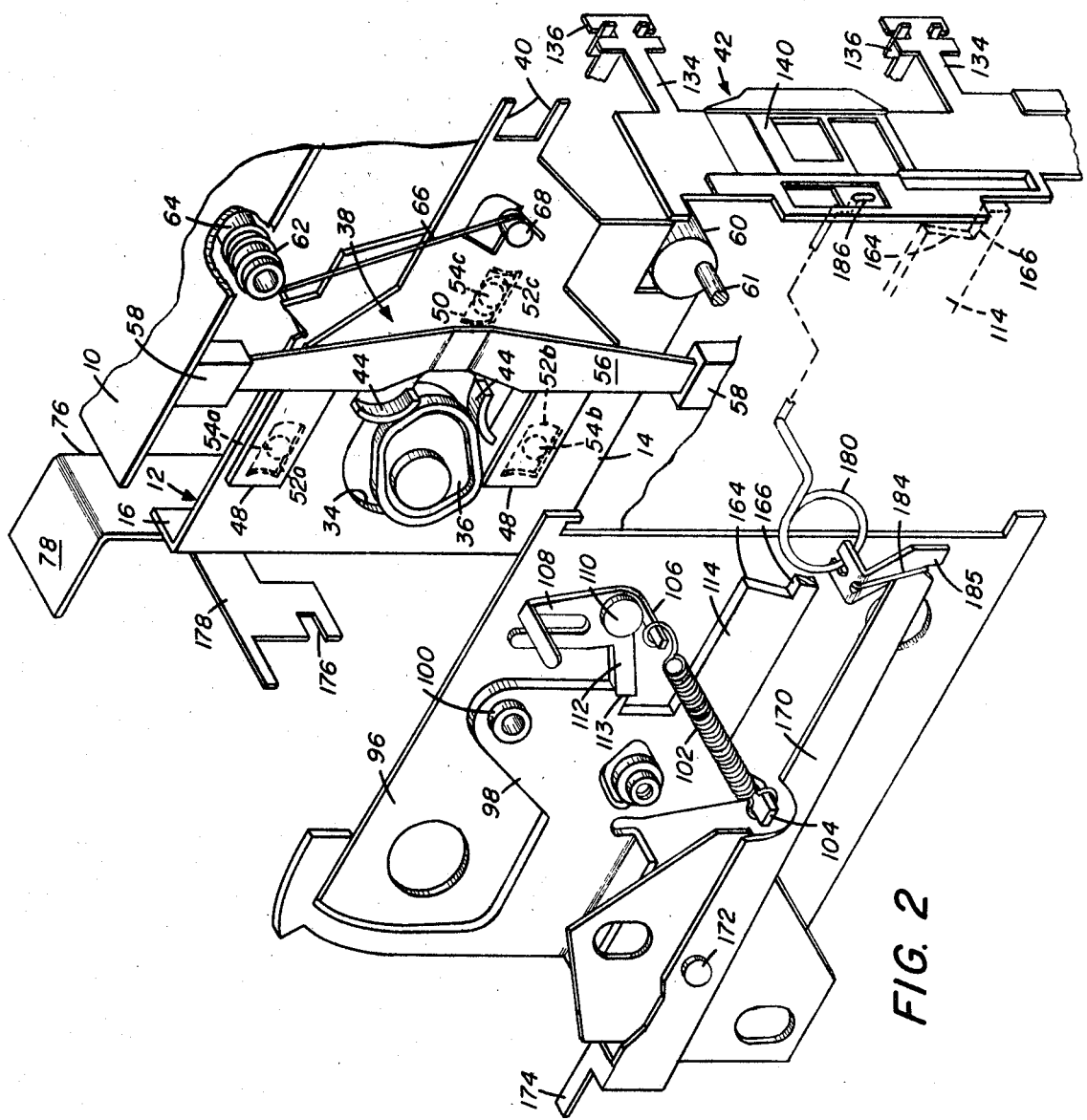

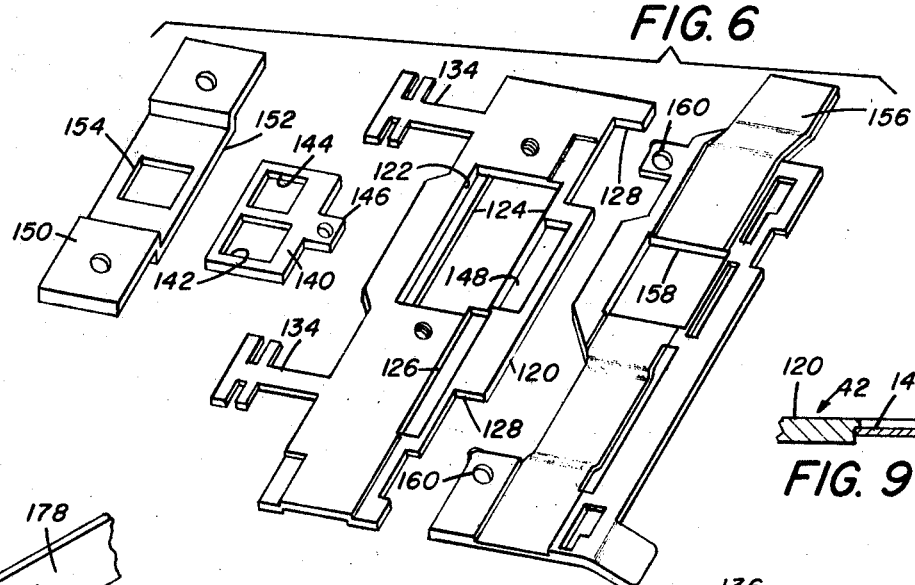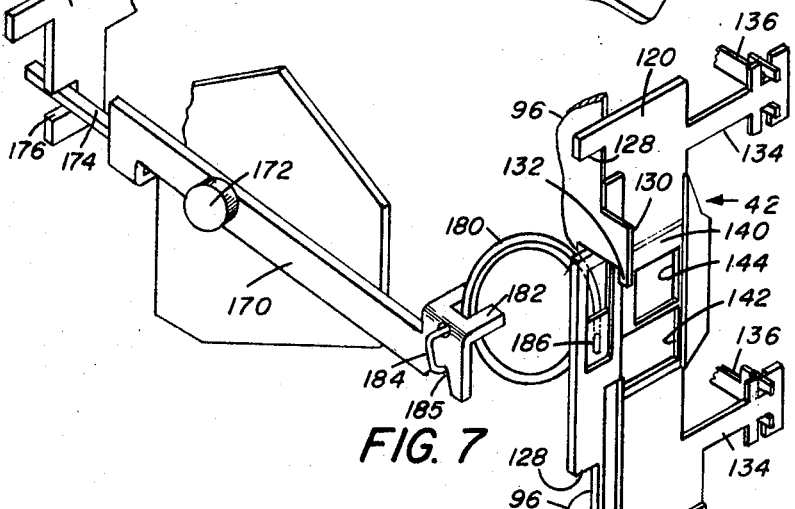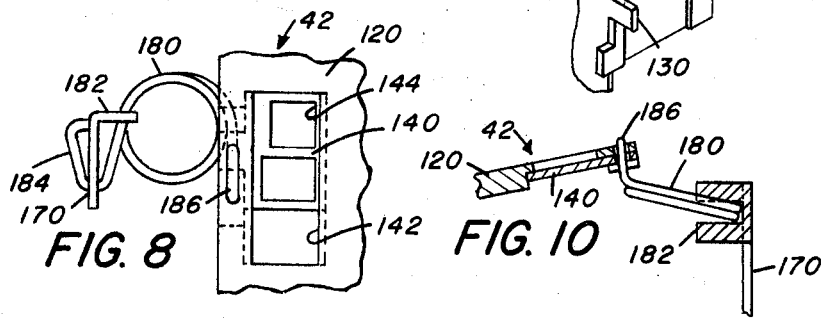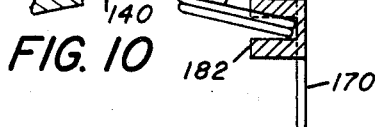

United States Patent Office 3,514,196
Patented May 26, 1970

3,514,196
MOTION PICTURE PROJECTOR
Robert J. Roman, Rochester, N.Y., assignor to Eastman Kodak Company, Rochester, N.Y., a corporation of New Jersey
Continuation of application Ser. No. 567,724, July 25, 1966. This application May 5, 1969, Ser. No. 824,733
Int. Cl. G03b 1/22
U.S. Cl. 352—79                                    20 Claims

ABSTRACT OF THE DISCLOSURE

A projector for accommodating both regular 8 and super 8 movie film is provided wherein the spacing of a pivot for a single pull-down mechanism is varied from the film gate to change the pull-down stroke. The pull-down mechanism is laterally shifted at the same time to align it with the film perforations. A film gate is provided which is movable by a film rewind mechanism from a film feed position to a film rewind position. The film gate also includes an aperture mask which is resiliently biased to one of two positions.

DESCRIPTION OF THE INVENTION

This application is a continuation of U.S. Ser. No. 567,724 filed July 25, 1966, now abandoned.

The present invention relates to an improved motion picture projector adapted to selectively project different types of motion picture film which differ in frame size and/or perforation arrangement.

Motion picture projectors which can selectively project different types or sizes of motion picture film are known in the art. For example, in copending application Ser. No. 434,494, filed on Feb. 23, 1965, by John J. Bundschuh et al. now abandoned and assigned to the same assignee as the present invention there is disclosed a projector having two film feeding mechanisms for selectively advancing two different types of film respectively and having a pivotal plate defining two projection apertures arranged to selectively position the apertures in alignment with the optical axis of the projector. A control member selectively renders the two film feeding mechanisms operative and selectively positions the pivotal plate.

While the above described projector achieves its intended purpose it possesses considerable complexity due to the provision of two film feeding mechanisms. Additionally, the pivotal aperture plate renders the gate and optical system unduly complex and generally unsuitable for use with automatic film rewinding mechanisms.

It is a principal object of the present invention to provide a means for rendering a single film feed mechanism operative with respect to different types of film.

Another object of the invention is to adjust the stroke and lateral position of a film claw member to render the claw member operative with respect to film of different perforation pitch, and location.

Another object of the invention is to modify the operation of a film claw member and adjust the gate aperture of a motion picture projector in response to movement of a single control member to selectively render a motion picture projector capable of projecting different types of film.

Another object of the invention is to provide a movie projector having a single film feed mechanism for selectively projecting regular 8 mm. film and super 8 mm. film.

Another object of the invention is to provide an improved aperture adjustment means for a motion picture projector which is particularly suitable for use with an automatic rewind mechanism.

Other objects and advantages will become apparent from the following description taken in connection with the accompanying drawings wherein:

FIG. 2 is an exploded perspective view of a portion of a motion picture projector illustrating a preferred embodiment of the present invention;

FIG. 6 is an exploded perspective view of the film gate assembly shown in FIGS. 2 and 3;

FIG. 7 is a perspective view of the film gate assembly with the pressure plate removed showing the aperture adjusting mechanism therefor;

FIG. 8 is a front view of a portion of the structure shown in FIG. 7; and

FIGS. 9 and 10 are top views of some of the parts shown in FIG. 8 illustrating the positions of several parts in the open and closed positions, respectively, of the film gate assembly.

Figure 1:
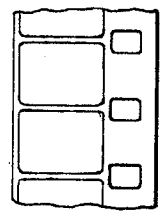
FIGS. 1 and 1a are schematic illustrations of two different types of film which a projector, in accordance with the invention, can selectively project.
Figure 1A:
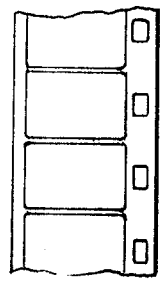

Referring to FIGS. 1 and 1a of the drawings, there is shown the two different types of film which the preferred embodiment of a projector in accordance with the invention is adapted to selectively project. The film has the same general overall width but differs in the size and format of the image area, the relative location of the image areas and the pitch, width and centerline location of the film perforations.

FIG. 1 of the drawings illustrates the format of regular 8 mm. movie film while FIG. 1a of the drawings illustrates the format of the new commercially available super 8 mm. film. The super 8 frame format is 211 mils wide by 158 mils high as compared to width and height dimensions of 172 and 129 mils for the regular 8 mm. frame format. The longer picture area in the case of the super 8 mm. film is accomplished by reducing the width of the perforations from 52 to 36 mils. The perforations are also placed as close as possible to the edge of the film while retaining a sufficient margin to resist edge pressure, wear, and breaks at the perforation corners.

The perforation pitch of the super 8 mm. film is approximately 166.7 mils as compared with 150 mils for the regular 8 mm. film. As will be apparent from FIG. 1a, the perforations of the super 8 mm. film are positioned opposite the center of the picture frames instead of at the frameline as in the case of regular 8 mm. film so that film splices will not pass through perforations.

Both the regular 8 mm. and super 8 film have the same overall width and can be guided through the same film gate without modification or adjustment of the gate. However, due to the differences in frame size and the size and locations of the perforations modification of the gate projection aperture and film feeding mechanism is required in accordance with the particular film size to be used in the projector.

Figure 3:
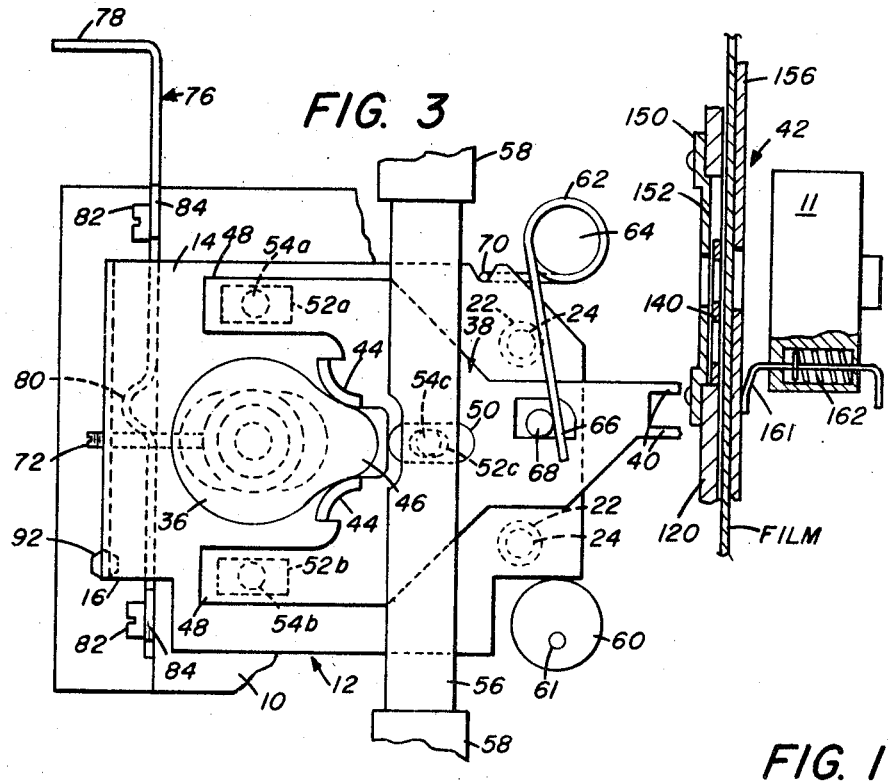
FIG. 3 is a side view of the film feeding mechanism and gate assembly shown in FIG. 2.
Figure 4:
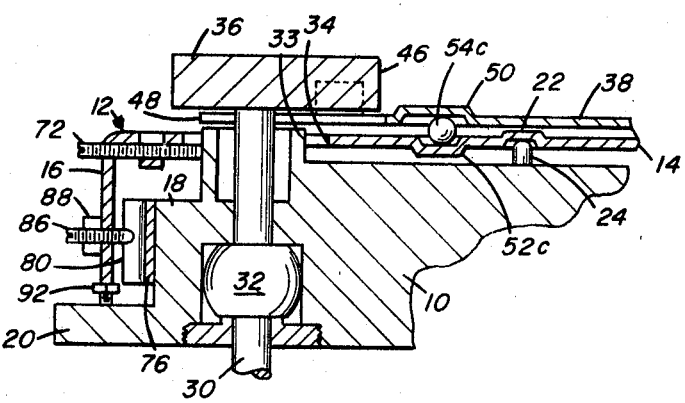
FIG. 4 is a bottom fragmentary sectional view of a portion of the film feeding mechanism shown in FIGS. 2 and 3.

Referring to FIGS. 2, 3 and 4 of the drawings, there is shown a subassembly housing 10 with the cover removed. The subassembly housing 10 is adapted to be mounted on a main projector housing (not shown) behind a lens system contained within a housing 11 (FIG. 3) and supports the film advancing and aperture mechanism and controls therefor as a unit in an operative position with respect to the lens system and other projector parts (not shown) which may be of a form well known to those skilled in the art. The film advancing and aperture mechanism in accordance with the invention may be utilized in connection with numerous types of motion picture projectors.

FILM FEEDING MECHANISM

Referring specifically to FIGS. 2, 3, and 4 of the drawings there is shown a supporting or framing plate 12 which includes a main plate portion 14 positioned in spaced, substantially parallel relationship with the base of housing 10 and an integral bent over portion 16 extending in spaced relationship with a shoulder 18 of the housing 10, as viewed in FIG. 4, with the edge thereof engaging a flange 20 of the housing 10 or an adjustment means later to be described. As shown in FIGS. 3 and 4 the plate portion 14 is provided with a pair of spaced flat bottomed depressions or recesses 22 on the underside thereof which receive and are engaged by a pair of rounded fulcrum pins 24 fixed to and extending outwardly from the housing 10. The recesses 22 are preferably of larger diameter than the pins 24 so that the framing plate 12 can be displaced relative to the housing 10 in the plane of plate portion 14.

The framing plate 12 is thus generally supported in spaced relationship with the housing 10 by the pins 24 and flange 20 as shown most clearly in FIG. 4 and is movable relative to the housing 10 as a result of the clearance between pins 24 and sides of recesses 22.

As shown most clearly in FIG. 4, a drive means comprising drive shaft 30 is rotatably supported in the wall of the subassembly housing 10 by means of a bearing 32 and extends coaxially through a boss 33 formed on the subassembly housing 10 and an elongated opening 34 in the portion 14 of framing plate 12. An in-and-out and up-and-down cycling cam 36 is fixed to one end of the shaft 30 in generally parallel spaced relationship with the plate portion 14. The other end of drive shaft 30 is driven by the projector drive motor (not shown) to rotate cam 36.

A film advancing member comprising a claw plate 38 having a pair of claw teeth 40 at one end thereof is adapted to be cyclically positioned through a pull-down cycle in the plane thereof relative to a film gate 42 by cam 36 to cause the claw teeth 40 to engage and advance a film through the film gate 42. To this end the claw plate 38 is provided with a pair of integral follower lugs 44 which are engaged by the peripheral lobes on the cam 36. The lobes are shaped in a manner well known in the art to effect cyclical movement of the plate 38 and in-and-out and up-and-down movement of the claw teeth 40 relative to the gate 42 to cause the claw teeth 40 to engage and advance a film through the gate 42.

In accordance with the invention the claw plate 38 is supported on the framing plate 12 for movement relative thereto during the pull-down cycle. As will later be described, the position and stroke of the claw plate 38 during the pull-down cycle is adjusted by positioning framing plate 12 to accommodate the different sizes of film hereinbefore described.

As shown most clearly in FIG. 3 the claw plate 38 is provided with a pair of spaced integral arms 48 extending on opposite sides of the cam 36 with substantial clearance as shown most clearly in FIGS. 2 and 3. The central portion of the claw plate 38 is provided with an elongated depression or recess 50 in the surface thereof facing portion 14 of plate 12 while the adjacent surface of the framing plate 12 is provided with three elongated spaced depressions or recesses 52a, 52b, and 52c. The depression 52c is positioned in juxtaposed relationship with the depression 50 as shown in FIG. 4.

Two bearing balls 54a and 54b are positioned in depressions 52a and 52b respectively and are engaged by the flat surfaces of the claw plate arms 48. A third bearing ball is captured by depressions 50 and 52c as shown more clearly in FIG. 4.

The depressions 52a and 52b in framing plate 12 are similar in size and have a length exceeding the in-and-out displacement of claw plate 38 and a sufficient flat bottom width to loosely constrain the balls 54a and 54b therein. On the other hand, depression 52c has a length slightly less than the in-and-out stroke of the claw plate 38 and is V-shaped to constrain the ball 54c to a limited extent. Depression 50 is also V-shaped to partially constrain the ball 54c but has a length exceeding the in-and-out displacement of claw plate 38.

The ball 54c effectively defines a pivot for the claw plate 38 during the film pull-down cycle as will presently be described in more detail. The shorter elongation of the depression 52c insures that the ball 54c will engage one end of the depression 52c at one end of the in-and-out stroke and the other end of the depression 52c at the other end of the in-and-out stroke to positively define the pivot point at these points in the pull-down cycle.

The claw plate 38 is biased into engagement with the balls 54a, 54b and 54c by a retaining leaf spring 56 the ends of which are supported in suitable slots formed in a pair of spring support posts 58. The center portion of the spring 56 engages a suitable abutment on the claw plate 38.

The framing plate 12 is biased to the right as viewed in FIG. 3 and also down into engagement with a framing cam 60 fixed to a shaft 61, and the claw plate 38 is biased into engagement with the in-and-out and up-and-down cam 36 by a biasing means comprising a single coil spring 62 encircling a boss 64 formed on the subassembly housing. One end 66 of the spring 62 engages a pin 68 fixed to the claw plate 38 to urge the follower lugs 44 into engagement with cam 36 while the other end 70 engages a notch in the framing plate 12 and biases the latter into engagement with the periphery of framing cam 60 and toward the gate 42.

Considering first the operation of claw plate 38, during the up-and-down portion of the pull-down cycle ball 54c effectively establishes a pivot point about which claw plate 38 is reciprocated by cam 36 to effect up-and-down movement of claw teeth 40 relative to gate 42. During the in-and-out portion of the cycle the claw plate 38 will be displaced in its plane transversely of the pivot point defined by ball 54c toward and away from the gate 42, the depressions 52a, 52b and 50 being sufficiently elongated as hereinbefore described to permit such in-and-out displacement. The claw plate 38 is thus effectively rolled on the balls 54a, 54b and 54c to effect in-and-out motion of the claw teeth 40.

The length of the up-and-down stroke of the claw teeth 40 is determined by the distance or effective lever arm between the pivot point defined by ball 54c and a film in gate 42 whereas the location of the up-and-down stroke is determined by the angular position of the ball 54c relative to the axis of shaft 30 and cam 36. Positioning of the framing plate 12 by the means later to be described serves to position the ball 54c to vary the up-and-down stroke of the claw teeth 40 or to shift the range of the up-and-down stroke relative to the gate 42.

While the in-and-out and up-and-down motions of the film claw plate 38 have been separately described, it will be apparent to those skilled in the art that such motions are overlapping during portions of the cycle by virtue of the configuration of cam 36. The motions have been separately described only to facilitate an understanding of the function of the balls 54a, 54b and 54c and the depressions in which they are retained and to facilitate an understanding of the various adjustment means now to be described.

Referring now specifically to the framing plate 12, it will be observed in FIG. 3 that the elongated opening 34 has a width substantially equal to the outside diameter of boss 33 which prevents up-and-down movement of the plate 12 relative to boss 33 but permits displacement of the plate 12 toward or away from the gate 42 or angular displacement of the plate 12 relative to the boss 33.

An adjustment screw 72 is threaded through the plate portion 16 and engages boss 33 to limit displacement of the plate 12 to the right toward gate 42 under the bias of spring 62 and to define the position of plate 12 during projection of regular 8 film. The screw 72 and the elongated edges of opening 34 thus engage boss 33 and partially constrain the plate 12 in the position shown in FIG. 3.

The framing cam 60 comprises a means for angularly displacing the framing plate 12 about the axis of shaft 30 and cam 36 to thereby angularly displace the claw plate pivot point defined by ball 54c. Such angular displacement of the pivot point shifts the range of up-and-down movement of the claw teeth 40 relative to the gate 42 to provide for accurate aligning of the frames in the projection aperture of gate 42 during the pull-down cycle.

In the position of the parts shown in FIG. 3 of the drawings rotation of the cam 60 serves to angularly displace the plate 12 and ball 54c relative to the axis of shaft 30 and cam 36. During such angular displacement the screw 72 and elongated edges of opening 34 engage the boss 33 under the bias of spring 62. The depressions or recesses 22 are sized to permit displacement of pins 24 therein through the range of adjustment required.

In the position of the framing plate 12 shown in FIGS. 2, 3, and 4 of the drawings the up-and-down stroke of the claw plate 38 and the lateral position of the claw teeth 40 are complemental to the perforation pitch and perforation location of regular 8 mm. film and such position of the framing plate 12 will be referred to as the regular 8 position. To render the film feed mechanism operative with respect to super 8 film the stroke of the claw plate 38 and the lateral position of the claw teeth 40 are adjusted by the means now to be described.

As previously mentioned, the up-and-down stroke of the claw teeth 40 is dependent on the distance or the length of the effective lever arm between the film and claw pivot point defined by ball 54c. The up-and-down stroke is lengthened to accommodate the super 8 perforation pitch by displacing framing plate 12 to the left to thereby displace ball 54c to the left to effectively increase the length of the effective lever arm.

Referring more specifically to FIGS. 3 and 4 of the drawings, the means for displacing the framing plate 12 comprises a shift lever 76 having a bent handle portion 78 on one end thereof and an arcuate cam portion 80, the midsection of which defines a curved surface concentric with the peripheral surface of boss 33. The lever 76 is physically positioned in the space between the bent over portion 16 of framing plate 12 and the shoulder 18 of the subassembly housing 10 and is slidably mounted on the shoulder 18 by a pair of spaced screws 82 extending through suitable elongated slots 84 in the shift lever 76 and threaded in shoulder 18. The slots 84 are arranged to permit sliding displacement of the shift lever 76 downward as viewed in FIG. 3 upon application of a displacing force to handle portion 78.

An abutment screw 86 (FIG. 4) is threaded in the bent over portion 16 of framing plate 12 to be engaged by the cam portion 80 of shift lever 76 upon downward displacement thereof. A lock nut 88 is threaded on screw 86 to prevent rotation thereof during operation of the shift lever 76.

In the position of the shift lever 76 shown in the drawings the cam portion 80 is out of engagement with screw 86 and such position will be referred to as the regular 8 position of the shift lever. If, however, the shift lever 76 is displaced downward, cam portion 80 will engage screw 86 and displace framing plate 12 to the left as viewed in FIG. 3 against the bias of spring 62. Such displacement of the framing plate 12 will shift the pivot point for the claw plate 38 to the left to lengthen the up-and-down stroke to that required for super 8 mm. film. The slots 84 may be sized to provide a stop limiting downward movement of the shift lever 76 to the position wherein the screw 86 engages the midsection of cam portion 80, such position being the super 8 position of the shift lever 76.

It will be apparent that the amount of stroke adjustment can be calibrated by adjustment of screw 86 to vary the displacement of framing plate 12 in response to displacement of shift lever 76. An important feature of the structure disclosed is that the stroke calibrating adjustment for super 8 mm. film provided by screw 86 is independent of the stroke calibrating adjustment provided by screw 72 for regular 8 mm. film since in the super 8 position of the plate 12 the screw 72 is out of engagement with the boss 33 and in the regular 8 position of the plate 12 the screw 86 is out of engagement with the cam portion 80 of shift lever 76.

Figure 5:
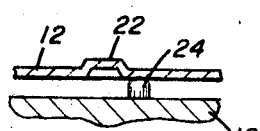
FIG. 5 is a fragmentary sectional view illustrating a different position of parts shown in FIG. 4.

The described displacement of plate 12 to the left by operation of shift lever 76 is also effective to displace the claw teeth laterally relative to a film in gate 42. In the regular 8 position of the framing plate 12, pins 24 engage depressions 22 of the framing plate 12 as shown. When the framing plate 12 is displaced to the left the depressions 22 will be positioned out of alignment with the pins 24 and the pins 24 will engage the flat portion of the framing plate 12 as shown in FIG. 5 to result in a net lateral displacement of the right end of framing plate 12 and claw plate 38 to thereby laterally shift the claw teeth 40 to the position required for super 8 mm. film to thereby render the claw teeth 40 movable through the pull-down cycle in a plane complemental to the centerline location of the perforations in super 8 mm. film.

To provide for adjustment or calibration of the lateral position of the claw teeth 40 in the super 8 position of the framing plate 12 a screw 92 is threaded in the subassembly housing 10 below the edge of the bent portion 16 of plate 12. The head of screw 92 is of sufficient width that it can be engaged by the edge of portion 16 in either the regular 8 or super 8 positions thereof. Rotation of screw 92 will cause the screw head to laterally displace the left end of frame plate 12 to pivotally displace the plate 12 on pins 24 and thus laterally shift the position of the claw teeth 40. While such adjustment affects both the super 8 and regular 8 positions of the claw teeth 40, in practice, the adjustment is only used in connection with projection of super 8 mm. film, the narrow perforations of which render the lateral position of the claw teeth 40 critical.

The framing cam 60 is also effective in the super 8 position of the framing plate 12 to shift the range of in-and-out movement of the claw teeth 40 relative to the film gate 42 to provide a framing adjustment. In the super 8 position, the plate 12 is partially constrained by engagement of screw 86 with cam portion 80 and engagement of the elongated edges of opening 34 with boss 33 such engagement being maintained by the biasing action of spring 62. Rotation of cam 60 will accordingly angularly displace framing plate 12 about the axis of cam 36 and shaft 30. Since the center of curvature of cam portion 80 coincides with said axis the framing plate 12 will not be displaced laterally during the framing adjustment.

While the framing cam 60 can be rotated to effect a framing adjustment in either the regular 8 or super 8 positions of the framing plate, generally such adjustment is not necessary when transferring from regular 8 mm. film to super 8 mm. film or vice versa. More particularly, the claw plate 38 is oriented with respect to the gate 42 whereby the claw teeth 40 engage the film perforations at a point approximately 5 frames below the projection aperture. Over this film length the half-frame difference in location of the regular 8 mm. film and super 8 mm. film perforations is substantially compensated for by the difference in perforation pitch of the two films. Any minor dimensional differences not compensated for can be eliminated in placing of the aperture mask hereinafter described. Accordingly only minor reframing, if any, is necessary to compensate for film tolerances.

The film feed mechanism described is thus capable of selectively feeding film of different perforation pitch, size and location through a film gate by a single claw member. It will be noted that the mechanism possesses considerable simplicity and few moving parts. It is to be particularly noted that only a single coil spring is utilized to bias the claw plate 38 and framing plate 12 relative to the actuating means therefor during the various functions of the mechanism.

The film feeding mechanism described above is enclosed by a plate 96 (FIG. 2) adapted to be attached to the subassembly housing 10 by screws (not shown). The plate 96 in addition to enclosing the film feeding mechanism serves as support for a portion of a film automatic rewind mechanism of the type disclosed and claimed in my copending application Ser. No. 397,451, filed on Sept. 18, 1964 and assigned to the same assignee as the present invention.

The portion of the rewind mechanism illustrated in FIG. 2 in general comprises a multi-arm lever 98 pivotally mounted on a pin 100 secured to the plate 96, and biased in a counterclockwise direction by a spring 102 having one end connected to a lug 104 of the lever 98 and the other end thereof connected to a lug 106 of a latch lever 108. The latch lever 108 is pivoted about a pin 110, and has an arm 112 for engaging a shoulder 113 on lever 98 for releasably holding lever 98 in a cocked position as shown in FIG. 2. During normal motion projection latch lever 108 latches the lever 98 in the position shown against the bias of spring 102. At the end of the film or when rewind is desired latch lever 108 is displaced counterclockwise about the pin 110 to release the lever 98 which in turn is displaced counterclockwise about pin 100 by the biasing force of spring 102 and becomes operative in the manner described in my copending application Ser. No. 397,451 to render a clutch and drive means (not shown) operative to rewind the film. During such pivotal displacement of lever 98, an arm 114 of lever 98 is effective to engage and displace the film gate 42 to thereby disengage the claws 40 from the film as will later be described in more detail in connection with the structure and operation of the gate assembly 42.

Only these parts of the rewind mechanism necessary to an understanding of the present invention have been herein shown and described. Reference is made to my copending application Ser. No. 397,451 for a complete description of the structure and operation of the mechanism.

FILM GATE AND APERTURE ADJUSTING MEANS

Referring to FIGS. 2 and 3 and 6–10 of the drawings and more specifically to FIG. 6, the film gate 42 in accordance with the invention comprises an aperture plate 120 having a longitudinal film track in the rear surface thereof of width complemental to regular 8 and super 8 film and having an elongated rectangular opening 122, the lower edges of which are provided with a pair of guide ribs 124. A slot 126 is provided to receive the claw teeth 40 and permit engagement of the same with the film during the pull-down cycle hereinbefore described. The aperture plate 120 is additionally provided with a pair of spaced recesses 128 which receive complementally spaced alignment lugs 130 (FIG. 7) formed on the edge of the supporting plate 96. One of the lugs 130 is provided with an integral stop or detent lug 132 at the end thereof for limiting displacement of the aperture plate 120. The aperture plate 120 is further provided with a pair of H shaped integral arms 134 which are adapted to be received in the end recesses of a pair of spring supporting arms 136 (FIG. 7) extending from a suitable bracket (not shown) attached to the subassembly housing 10. As shown most clearly in FIG. 7 when the gate 42 is closed during film projection to permit the claw teeth 40 to engage and advance the film, the edge of the aperture plate 120 will engage the side surfaces of the lugs 130 under the bias of spring arms 136 and the surface of plate 120 will engage the edge of supporting plate 96 under the bias of a means later to be described. When the gate 42 is displaced by lever 98 during operation of the rewind mechanism the aperture plate 120 will be pivoted outward about arms 136 to the position shown in FIG. 10. Such operation will be hereinafter described in more detail in connection with operation of the entire gate assembly.

Referring again specifically to FIG. 6 of the drawings, the gate 42 further includes an aperture mask 140 having a super 8 aperture opening 142 and a regular 8 aperture opening 144 which is positioned in the opening 122 in engagement with guide ribs 124 and is adapted to be slidably positioned on said guide ribs to selectively position the super 8 aperture opening 142 and regular 8 aperture opening 144 into alignment with the optical axis of the projector lens system contained within housing 11 (FIG. 3). One side portion of the mask 140 is provided with a tab 146 which is slidably received in an elongated recess 148 of the aperture plate 120. The ends of the recess 148 are oriented to be engaged by the tab 146 in the regular 8 and super 8 positions of the mask 140 and thus define stops for said positions. The apertures 142 and 144 may be oriented relative to said stops to compensate for any difference in framing dimensions not compensated for the claw teeth location and difference in film pitch hereinbefore described.

A mask enclosure plate 150 having an offset center portion 152 of size complemental to opening 122 and having and aperture 154 at least equal in size to the aperture 142 is riveted to the aperture plate 120 with portion 152 positioned in opening 122 as shown in FIG. 3. The spacing between the bottom surface of portion 152 and guide rib 124 is such as to permit mask 140 to freely slide between the two positions thereof.

To complete the assembly of parts forming gate 42, a film pressure plate 156 (FIGS. 3 and 6) is positioned in engagement with the rear surface of aperture plate 120 to retain the film in the film track and establish a predetermined film gate tension in a manner well known to those skilled in the art. The pressure plate 156 is provided with a suitable opening 158 for alignment with the lens system and a pair of spaced holes 160 adapted to receive complemental pins (not shown) in the rear surface of the aperture plate 120. The pressure plate 156 is retained in operative engagement with the aperture plate 120 by the biasing means hereinafter described.

Referring now more specifically to FIG. 3 of the drawings the gate assembly 42 is biased to a closed position for film projection as shown by a biasing means supported with the lens system housing 11. This biasing means comprises a plunger 161 biased to the left as viewed in FIG. 3 by a spring 162 mounted in compression between the plunger 161 and the wall of the housing 11 as shown. The end of the plunger 161 engages the pressure plate 156 and urges the gate assembly 42 to the position shown in FIGS. 3 and 7 wherein the aperture plate 120 engages the edge of support plate 96 as shown in FIG. 7. The spring pressure serves to also retain the pressure plate 156 in operative engagement with the aperture plate 120 and thus retain it as part of the gate assembly.

Considering now the positioning of gate 42 during rewind, when the lever 98 is released by latching lever 112, the arm 114 will be displaced into engagement with the gate assembly as indicated in FIG. 2 by the dashed lines and pivotally displace the assembly against the bias of spring 162 toward the lens system housing 11. The lever arm 114 is provided with two projections 164 and 166 of unequal length which engage aperture plate 120 and pressure plate 156 respectively during said displacement. As disclosed in the aforementioned copending application the unequal length of the projections 164 and 166 effectively separates the pressure plate and aperture gate in the displaced position thereof to remove the film gate tension from the film during rewind.

Considering now the structure for positioning the mask between its two previously described positions, means are provided for positioning the mask 140 in response to the actuation of shift lever 76 so that the gate aperture size is adjusted simultaneously with the stroke and lateral position of the claw plate in response to movement of a single control member. Referring more specifically to FIGS. 2 and 7 of the drawings this means includes a lever 170 pivoted on a pin 172 fixed to a bracket attached to the supporting plate 96. One end of the lever 170 is provided with an integral positioning lug 174 which is received in a notch 176 formed in the end of an actuating arm 178 formed integrally with and extending laterally from actuating lever 76 as shown most clearly in FIG. 2. When the shift lever 76 is displaced in the manner hereinbefore described, the accompanying displacement of arm 178 will effect counterclockwise displacement of lever 170 about pivot pin 172 to displace the right end of lever 170 upward.

The right end of lever 170 is operatively connected to the aperture mask 140 by a yieldable means comprising a wire spring 180 which in the present embodiment comprises a length of spring wire coiled as shown to form approximately one and one-half convolutions intermediate the end portions of the wire. One side of the spring 180 is received in a notch 182 formed in an integral lateral extension of the end of lever 170. One end 184 of the spring 180 is positioned through a hole in the end of lever 170 and bent over into firm engagement with the face of the lever 170 and into engagement with a notch 185 in the lower edge of lever 170 to retain and physically support the spring 180 in notch 182 in a plane substantially parallel to the gate assembly 42 as shown most clearly in FIG. 7.

The other end 186 of the spring 180 is bent perpendicular to the spring plane at the end of the convolutions, extended through a suitable hole in the tab 146 of mask 140 and a slot in the bottom of recess 148 and then bent over parallel to the aperture plate 120 as shown in FIGS. 2 and 7 to thereby operatively connect the other side of the spring 180 to the aperture mask 140.

The described mounting of spring 180 establishes a yieldable operative connection between the end of lever 170 and mask 140 the operation of which will now be described. When the lever 170 is in the position shown in FIG. 2 the mask 140 is biased by the spring 180 to its regular 8 position wherein the smaller aperture 144 is aligned with optical axis of the lens system and the tab 146 engages the lower end of recess 148. When lever 170 is pivoted counterclockwise in response to actuation of shift lever 76, the spring 180 will be displaced upward with the end of lever 170 to displace the mask 140 to its super 8 position wherein the larger aperture 142 is positioned in alignment with the optical axis of the lens system and tab 146 engages the upper end of the recess 148. The spring 180 is sufficiently rigid to effect positive displacement of the mask 140 between the two positions thereof but possesses sufficient resiliency to permit override movement of the end of lever 170 relative to the mask and to bias the mask 140 to the regular 8 or super 8 position thereof depending on the positions of lever 170. The spring 180 is also effective to bias the mask 140 toward engagement with the left edge of opening 122 as viewed in FIG. 6 to accurately define the lateral position of the mask.

The spring 180 also uniquely permits opening and closing of the gate 42 during operation of the rewind mechanism without affecting the described operative connection between the lever 170 and mask 140. Referring specifically to FIGS. 9 and 10 which illustrate the closed and open positions of the aperture plate 120 respectively, when the aperture plate 120 is displaced during opening of the gate 42 the spring 180 yields with a hinging action relative to its ends and assumes the position illustrated in FIG. 10 when the gate assembly is fully open. If desired, the lever 170 may be actuated in the open position of the gate 42 to position the mask 140.

The preferred embodiment of the invention herein disclosed is thus capable of selectively projecting two different films with a single gate assembly 42 and a single film advancing member comprising claw plate 38. A single control member comprising shift lever 76 is effective to selectively adjust the stroke and lateral position of the film advancing member and the aperture size to thus selectively adjust tthe projector mechanism for operation with either film. While the disclosed film feeding and aperture adjustment mechanisms have particular utility in combination, it will be apparent that the two mechanisms individually constitute novel features of the present invention and may be independently utilized to provide their respective functions in a projector system.

This invention has been described in detail with particular reference to a preferred embodiment thereof, but it will be understood that variations and modifications can be effected within the spirit and scope of the invention.

I claim:

1. In a projector for selectively projecting at least two different films having film perforations of different pitch which are located along different centerlines relative to a film edge, the combination comprising:
   a film gate defining a plane;
   a film advancing member defining a surface for engaging film perforations;
   means defining a single pivot for said film advancing member;
   means for moving said film advancing member about said single pivot to effect first cyclical movement of said surface in a predetermined range generally parallel to the plane of said gate and for moving said film advancing member transversely of said pivot to effect second cyclical movement of said surface toward and away from the plane of sai dgate to cyclically move said surface through a cycle relative to said gate to effect intermittent engagement of said surface with the film perforations to thereby advance film through said gate;
   means for positioning said single pivot relative to said film gate plane to change the range of said first cyclical movement of said surface to correspond to the perforation pitch of the type of film being projected; and
   means for laterally displacing said film advancing member with respect to said film gate between a first position, aligned with the perforation centerlines of one film, and a second position, aligned with the perforation centerline of a second film, for effecting movement of said surface selectively in each of said positions.

2. In a projector for selectively projecting at least two different films, said films having perforations located along different centerlines relative to a film edge, the combination comprising:
   a film gate;
   a film advancing member defining a surface for engaging film perforations;
   means defining a single pivot for said film advancing member;
   means for pivotally displacing said film advancing member about said single pivot and for displacing said film advancing member transversely of said single pivot to effect cyclical movement of said surface through a film pull-down cycle to cause said surface to intermittently engage the film perforations for advancing film through said gate; and
   means for laterally displacing said film advancing member with respect to said film gate between a first position, aligned with the perforation centerline of one film, and a second position, aligned with the perforation centerline of a second film, for effecting movement of said surface selectively in each of said positions.

3. In a projector for selectively projecting a first film having a first perforation pitch located along a first centerline relative to a film edge and a second film having a second perforation pitch located along a second centerline relative to a film edge, the combination comprising:
a film gate defining a plane and having means defining a projection aperture;
a movably mounted supporting mechanism having a first position during projection of the first film and a second position during projection of the second film;
a laterally shiftable film advancing means having film perforation engaging means thereon;
means defining a pivot for said film advancing means on said supporting mechanism in spaced relationship with said film gate plane;
means for supporting said film advancing means on said supporting mechanism for movement toward and away from said film gate to effect first cyclical movement of said film perforation engaging means toward and away from the plane of said gate and for pivotal movement about said pivot to effect second cyclical movement of said film perforation engaging means generally parallel to the plane of said gate so that said film perforation engaging means is intermittently engageable with said film perforations to advance film through said film gate, the range of said second cyclical movement of said film perforation engaging means being determined by the spacing of said pivot from said film gate plane and said range corresponding to the perforation pitch of the first film in said first position of said supporting mechanism and corresponding to the perforation pitch of the second film in said second position of said supporting mechanism;
means for moving said supporting mechanism between said first position and said second position thereof to position said pivot relative to said film gate plane so that the second cyclical movement of said film perforation engaging means selectively corresponds to the perforation pitch of the first and second film; and
means for laterally shifting said film advancing means with respect to said film gate during movement of said supporting mechanism between said first position and said second position to align said film perforation engaging means with said first and second centerlines, respectively.

4. In a projector as claimed in claim 3 wherein:
said first film comprises regular 8 mm. film;
said second film comprises super 8 mm. film; and
said film advancing means is positionable relative to said film gate to render the film perforation engaging means thereon engageable with the film being projected at a point spaced from said projection aperture by a distance approximately equal to 5 frames of said first film.

5. In a projector as claimed in claim 3 wherein said means for moving said supporting mechanism comprises:
a slidably mounted displaceable shift lever;
an abutment on said supporting mechanism; and
a cam surface on said shift lever engageable with said abutment upon displacement of said shift lever.

6. In a projector for selectively projecting two different films having perforations differing in centerline location, a combination comprising:
a housing;
a film gate defining a plane and having means defining a projection aperture;
a movable framing plate having first and second end portions and having means defining a pair of spaced recesses;
means for supporting said first end portion of said plate on said housing;
a pair of spaced pins extending from said housing and engageable with said plate to support said second end portion of said plate, said pins and said supporting means movably supporting said plate in spaced relationship to said housing, said plate having a first position relative to said housing wherein said pins are engageable with said recesses to support said plate in a first plane substantially perpendicular to said gate and said plate having a second position relative to said housing when said pins are engageable with the surface of said plate adjacent said recesses to support said plate in a second plane laterally displaced with respect to said gate from said first plane;
means for moving said framing plate between said first position and said second position; and
film advancing means supported on said plate for first cyclical movement toward and away from said film gate plane and second cyclical movement generally parallel to said film gate plane so that said film advancing means is intermittently engageable with the film perforations to advance film through said gate, said film advancing means being engageable with the perforations of one of said films when said framing plate is in said first position and engageable with the perforations of the other of said films when said framing plate is in said second position.

7. In a projector, as claimed in claim 6, wherein:
said one end portion of said framing plate comprises a bent over portion extending toward said housing; and
said means for supporting said first end portion of said framing plate comprises a screw threaded in said housing and engageable by said one end, said screw being adjustable to vary the position of said framing plate relative to said housing.

8. In a projector as claimed in claim 6 wherein:
said means for displacing said framing plate comprises:
a lever slidably mounted on said housing and defining a cam surface; and
an adjustable abutment screw threaded in said framing plate engageable by said cam surface of said lever.

9. In a projector for selectively projecting two different films having perforations differing in pitch and centerline location the combination comprising:
a housing;
a film gate lying in a plane and having means defining a projection aperture;
a displaceable framing plate having a first and second end portion and having means defining a pair of spaced recesses;
means for supporting said first end portion of said framing plate on said housing;
a pair of spaced pins extending from said housing and engageable with said framing plate to support said second end portion of said framing plate, said pins and said supporting means movably supporting said framing plate in spaced relationship to said housing, said framing plate having a first position relative to said housing wherein said pins are engageable with said recesses to support said framing plate in a first plane substantially perpendicular to said gate and said framing plate having a second position wherein said pins are engageable with the surface of said plate adjacent said recesses to support said plate in a second plane laterally displaced with respect to said gate from said first plane;
means for displacing said framing plate from said first position to said second position thereof;

a rotatable and displaceable film advancing plate having film perforation engaging means thereon;

a plurality of spaced bearing balls for displaceably supporting said film advancing plate on said framing plate in spaced relationship therewith, one of said balls defining a pivot point for rotation of said film advancing plate about said framing plate;

means for effecting rotation of said film advancing plate about said pivot point and for effecting transverse displacement of said film advancing plate relative to said pivot point to move said perforation engaging means through a film advancing cycle having a range of movement corresponding to the perforation pitch of a first film in said first position of said framing plate and corresponding to the perforation pitch of a second film in said second position of said framing plate.

10. In a projector, as claimed in claim 9, further including:

first means for adjustably positioning said framing plate relative to said housing to determine said first position thereof; and second means operable independent of said first means for adjustably positioning said framing plate relative to said housing in said second position thereof.

11. In a projector for selectively projecting at least two films differing in perforation pitch and frame size wherein perforations of each of the films are located along different centerlines relative to a film edge, the combination comprising:

a housing;

a film gate in a plane;

a support member movably mounted on said housing having a first position relative to said gate and a second position relative to said gate;

means defining a pivot on said support member said pivot being spaced from said gate by a first distance in said first position of said member and being spaced from said gate a second distance in said second position of said member;

a laterally shiftable, displaceable and pivotal film advancing member having film perforation engaging means, said film advancing member being supported on said support member for pivotal movement about said pivot and transverse movement relative to said pivot;

cam means for laterally shifting said film advancing member with respect to said film gate during movement of said support member between said first position and said second position to align said film perforation engaging means with each of said centerlines, respectively, and for displacing said film advancing member transversely of said pivot to effect movement of said film engaging means toward and away from said gate and for pivoting said film advancing member about said pivot to effect movement of said film engaging means through a range generally parallel to said gate plane, said film engaging means being engageable with the perforations of a film to advance the same through said gate, the range of said movement being dependent on the distance of said pivot from said gate and corresponding to the perforation pitch of a first film in said first position of said support member and corresponding to the perforation pitch of a second film in said second position of said support member;

an aperture mask at said gate movable between first and second positions, said aperture mask having means defining a first projection aperture for the first film when in said first position and having means defining a second projection aperture for the second film when in said second position; and a single control member cooperative with said aperture mask and said support member for moving each of them from their respective first positions to their respective second positions.

12. In a projector for selectively projecting filmstrips differing in perforation pitch and frame size, the combination comprising:

a housing;

a film gate defining a plane;

an aperture mask at said gate movable between first and second positions, said aperture mask having means defining a first projection aperture for a first filmstrip when said mask is in said first position and having means defining a second projection aperture for a second filmstrip when said mask is in said second position;

a first lever pivotally mounted intermediate first and second ends thereof on said housing;

a spring connecting the first end of said lever to said aperture mask for moving said aperture mask between said first and second positions in response to movement of said first lever;

a supporting plate movably mounted on said housing and having a first position relative to said gate and a second position displaced laterally with respect to said gate;

means defining a pivot on said plate spaced from said gate by a first distance in said first position of said plate and spaced from said plate by a second distance in said second position of said plate;

a film advancing member having a film perforation engaging surface, said film advancing member being mounted on said supporting plate for pivotal movement about said pivot to effect movement of said film perforation engaging surface through a range along a path generally parallel to said film gate plane and for transverse movement relative to said pivot to effect movement of said film perforation engaging surface toward and away from said film gate plane so that said surface is engageable with said film to advance it through said gate, the range of said movement of said surface along said path being determined by the distance of said pivot from said gate and corresponding to the perforation pitch of a first film when said supporting plate is in said first position and corresponding to the perforation pitch of a second film when said supporting plate is in said second position;

cam means rotatably mounted on said housing for effecting said pivotal movement and said transverse movement of said film advancing member; and a second lever slidable between first and second positions for moving said supporting plate between said first and second positions thereof and for moving said first lever about said pivot to move said aperture mask between said first and second positions thereof.

13. In a projector for selectively projecting at least two different types of film which have different frame sizes, the combination comprising:

a housing;

a film gate assembly through which film is intermittently advanced;

a lens system positioned adjacent said gate and defining an optical axis;

an aperture mask slidably supported within said gate assembly and having means defining a first aperture of one size for a first type of film and having means defining a second aperture of a second size for a second type of film, said mask having a first position wherein said first aperture is aligned with said optical axis and a second position wherein said second aperture is aligned with said optical axis;

a displaceable lever mounted on said housing for movement between first and second positions; and yieldable means connecting said lever to said mask for sliding said mask between said first and second positions thereof in response to displacement of said lever between said first and second positions of said lever and for biasing said mask to said first position thereof in said first position of said lever and for biasing said mask to said second position thereof in said second position of said lever.

14. In a projector for selectively projecting two different films which have different frame sizes, said projector having a rewind mechanism and a lens system, the combination comprising:
a housing;
a film gate pivotally supported on said housing for movement between a first position for film projection and a second position for film rewind;
a lens system positioned adjacent said gate and defining an optical axis;
claw means supported on said housing for movement relative to said gate to intermittently engage and advance a film through said gate when said gate is in said first position thereof;
means engageable with said gate to pivot said gate from said first position to said second position for film rewind;
a member movably supported in said gate, said member having means defining a first projection aperture for a first film and having means defining a second projection aperture for a second film;
a displaceable actuating member mounted on said housing for selectively positioning said aperture defining member to selectively align said first and second apertures with the optical axis of said lens system; and
yieldable means connecting said actuating member to said aperture defining member to effect movement of said aperture defining member in response to displacement of said actuating member and to facilitate movement of said aperture defining member relative to said actuating member during pivotal movement of said gate from said first position to said second position.

15. In a projector as claimed in claim 14 wherein: said yieldable means comprises a coiled wire spring defining a plane substantially parallel to said gate in said first position of said gate.

16. In a projector as claimed in claim 14 wherein: said means for engaging and pivoting said gate comprises a lever pivotally mounted on said housing and having one end engageable with said gate.

17. In a projector as claimed in claim 14 wherein: said actuating member for said aperture defining member comprises a lever pivotally mounted on said housing; and
said yieldable means comprises a circular wire spring.

18. In a projector for selectively projecting at least two films differing in film perforation pitch and frame size wherein perforations of each of the films are located along different centerlines with respect to a film edge, the combination comprising:
a film gate defining a plane;
a pivotal, movable and laterally shiftable film advancing member defining a surface for engaging film perforations;
means defining a single pivot for said film advancing member;
means for moving said film advancing member about said single pivot to effect first cyclical movement of said surface in a predetermined range generally parallel to the plane of said gate and for moving said film advancing member transversely of said pivot to effect second cyclical movement of said surface toward and away from the plane of said gate to cyclically move said surface through a cycle relative to said gate to effect intermittent engagement of said surface with the film perforations to thereby advance film through said gate;
means for laterally displacing said film advancing member with respect to said film gate between a first position, aligned with the perforation centerline of one film, and a second position, aligned with the perforation centerline of a second film, for effecting movement of said surface selectively in each of said positions;
an aperture mask at said gate movable between first and second positions, said aperture mask having means defining first and second projection apertures for said different films when said mask is in said respective first and second positions; and
a single control member for positioning said single pivot relative to said film gate plane for changing the range of said first cyclical movement of said surface corresponding to the perforation pitch of the type of film to be projected, for laterally displacing said film advancing member with respect to said film gate between said first position, aligned with the perforation centerline of one film, and said second position, aligned with the perforation centerline of a second film, and for moving said aperture mask simultaneously to one of said positions thereof corresponding to the frame size of the type of film to be projected.

19. In a projector for selectively projecting at least two films, said films having different frame sizes and having perforations located along different centerlines relative to their respective film edges, the combination comprising:
a film gate;
a film advancing member defining a surface for engaging film perforations;
means defining a single pivot for said film advancing member;
means for pivotally displacing said film advancing member about said single pivot and for displacing said film advancing member transversely of said single pivot to effect cyclical movement of said surface through a film advancing cycle to cause said surface to intermittently engage the film perforations for advancing film through said gate;
means for laterally displacing said film advancing member with respect to said film gate between a first position, aligned with the perforation centerline of one film, and a second position, aligned with the perforation centerline of a second film, for effecting movement of said surface selectively in each of said positions;
an aperture mask at said gate movable between first and second positions, said aperture mask having means defining first and second projection apertures for said different films when said mask is in said respective first and second positions; and
a single control means for laterally displacing said film advancing member with respect to said film gate between said first position, aligned with the perforation centerline of one film, and said second position, aligned with the perforation centerline of a second film, and for moving said aperture mask simultaneously between said first and second positions of said mask.

20. In a projector for selectively projecting a first film having a first perforation pitch and a second film having a second perforation pitch, the combination comprising:
a film gate defining a plane and having means defining a projection aperture;
a movably mounted supporting mechanism having a first position during projection of the first film and a second position during projection of the second film;
a film advancing means having film perforation engaging means thereon;
means defining a pivot for said film advancing means on said supporting mechanism in spaced relationship with said film gate plane;

means for supporting said film advancing means on said supporting mechanism for movement toward and away from said film gate to effect first cyclical movement of said film perforation engaging means toward and away from the plane of said gate and for pivotal movement about said pivot to effect second cyclical movement of said film perforation engaging means generally parallel to the plane of said gate so that said film perforation engaging means is intermittently engageable with said film perforations to advance film through said film gate, the range of said second cyclical movement of said film perforation engaging means being determined by the spacing of said pivot from said film gate plane and said range corresponding to the perforation pitch of the first film in said first position of said supporting mechanism and corresponding to the perforation pitch of the second film in said second position of said supporting mechanism;

means for moving said supporting mechanism between said first position and said second position thereof to position said pivot relative to said film gate plane so that the second cyclical movement of said film perforation engaging means selectively corresponds to the perforation pitch of the first and second films;

a rotatably mounted cycling cam engageable with said film advancing means for moving said film advancing means through said first and second cyclical movements;

a rotatably mounted framing cam engageable with said supporting mechanism for shifting the range of said second cyclical movement of said film engaging means; and a coil spring having a first end cooperative with said supporting mechanism for biasing said supporting mechanism against said framing cam and toward one of said positions of said supporting mechanism and having a second end cooperative with said film advancing means for biasing said film advancing means toward engagement with said cycling cam.

References Cited
UNITED STATES PATENTS

| | | |
|---|---|---|
| 2,481,115 | 9/1949 | Heurtier. |
| 3,338,490 | 8/1967 | Hara. |
| 3,427,101 | 2/1969 | Jorgensen_____ 352—194 X |

NORTON ANSHER, Primary Examiner

M. H. HAYES, Assistant Examiner

U.S. Cl. X.R.

226—65; 352—124, 162, 191.